(12) United States Patent
Dennison et al.

(10) Patent No.: US 8,786,877 B2
(45) Date of Patent: Jul. 22, 2014

(54) MODIFICATION OF POST-PRINT INSTRUCTIONS FOR DOCUMENTS OF PRINT JOBS ALREADY WITHIN AN ADF SYSTEM

(75) Inventors: Carl Dennison, Longmont, CO (US); Ned Otey, Louisville, CO (US); Adam A. Swartz, Thornton, CO (US); Brent Winters, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 655 days.

(21) Appl. No.: 13/011,083

(22) Filed: Jan. 21, 2011

(65) Prior Publication Data

US 2012/0188588 A1 Jul. 26, 2012

(51) Int. Cl.
*G06F 3/12* (2006.01)

(52) U.S. Cl.
USPC .................. 358/1.15; 358/1.13; 358/1.14

(58) Field of Classification Search
USPC ................................ 358/1.1, 1.15
See application file for complete search history.

(56) References Cited

U.S. PATENT DOCUMENTS

| | | | |
|---|---|---|---|
| 6,762,851 B1 | 7/2004 | Lynch et al. | |
| 7,741,575 B2 | 6/2010 | Bowers et al. | |
| 2003/0038961 A1* | 2/2003 | Lynch et al. | 358/1.15 |
| 2005/0018214 A1 | 1/2005 | DeWitt et al. | |
| 2005/0031162 A1 | 2/2005 | Sagi et al. | |
| 2005/0132057 A1* | 6/2005 | Bresnan et al. | 709/227 |
| 2007/0285700 A1 | 12/2007 | Suenaga et al. | |
| 2010/0049536 A1 | 2/2010 | Quine et al. | |

* cited by examiner

*Primary Examiner* — King Poon
*Assistant Examiner* — Iriana Cruz
(74) *Attorney, Agent, or Firm* — Duft Bornsen & Fettig LLP

(57) ABSTRACT

Systems and methods for modification of post-print instructions. The system includes a data center and a post-printing system. The data center is operable to receive a first print job that includes a plurality of documents and a first post-print instruction defining how the documents are processed after printing. The data center is also operable to receive a request that one or more documents in the print job be processed according to a second post-print instruction, and to extract the document(s) from the print job to generate a second print job. The second print job includes the extracted document(s) and the second post-print instruction defining how the document(s) are processed after printing. The post-printing system is operable to process the remaining documents of the first print job according to the first post-print instruction, and to process the document(s) of the second print job according to the second post-print instruction.

18 Claims, 4 Drawing Sheets

FIG. 3

Review job 10127220

Filter: ●All ○Unchanged ○Split ○Diverted ○Undiverted ○Search results

Changes Pending
Split 4
Diverted 0
Undiverted 0
Changed mail pieces 4
Total mail pieces 1288

Goto Document [1] [Search] Found 1 Matches [Go To Next Match]
[Prev Page] [Next Page] [Goto Page] [2] [Change Page Size] [500] Page 2 of 3

| Id | Review Status | Divert Indicator | Dispatch Type | Account Number | Mail Code | Address 1 |
|---|---|---|---|---|---|---|
| 501 | | N | USPS_PreSort | | 0 | |
| 502 | | N | USPS_PreSort | | 0 | |
| 503 | | N | USPS_PreSort | | 0 | |
| 504 | | N | USPS_PreSort | | 0 | |
| 505 | | N | USPS_PreSort | | 0 | |
| 506 | | N | USPS_PreSort | | 0 | |
| 507 | | N | USPS_PreSort | | 0 | |
| 508 | Split | N | USPS_PreSort | | 0 | |
| 509 | Split | N | USPS_PreSort | | 0 | |
| 510 | Split | N | USPS_PreSort | | 0 | |
| 511 | Split | N | USPS_PreSort | | 0 | |
| 512 | | N | USPS_PreSort | | 0 | |
| 513 | | N | USPS_PreSort | | 0 | |
| 514 | | N | USPS_PreSort | | 0 | |
| 515 | | N | USPS_PreSort | | 0 | |
| 516 | | N | USPS_PreSort | | 0 | |
| 517 | | N | USPS_PreSort | | 0 | |
| 518 | | N | USPS_PreSort | | 0 | |
| 519 | | N | USPS_PreSort | | 0 | |
| 520 | | N | USPS_PreSort | | 0 | |
| 521 | | N | USPS_PreSort | | 0 | |
| 522 | | N | USPS_PreSort | | 0 | |
| 523 | | N | USPS_PreSort | | 0 | |
| 524 | | N | USPS_PreSort | | 0 | |

Selected Item

[Split] [Divert] [Reset] [View] [Complete] [Cancel]

MODIFICATION OF POST-PRINT INSTRUCTIONS FOR DOCUMENTS OF PRINT JOBS ALREADY WITHIN AN ADF SYSTEM

FIELD OF THE INVENTION

The invention relates to Automated Document Factory (ADF) systems, and in particular, to post-print instructions for documents within print jobs in an ADF system.

BACKGROUND

Production printing systems generally include a high-speed printer used for volume printing, and may be capable of printing 100 pages per minute or more. Production printing systems are often continuous-form printers that print on paper or other printable media. Automated Document Factories (ADF's) provide functionality that enhances the performance of production printing systems by providing functional modules that govern the printing process. For example, an ADF may functionally address: input constraints; data transformation; delivery preparation of documents; and control/reporting of the production printing system itself. Because of this enhanced functionality, ADF's are preferred for numerous high-volume printing applications including mass-mail printing and newspaper printing.

A host system produces print jobs to be processed by an ADF for printing. A print job typically contains a plurality of logical documents to be printed. The host system transfers print jobs to the ADF and the ADF adds the print jobs to a print queue. Each print job includes an instruction defining how its documents are treated after printing. For example, the instruction could indicate that the printed documents should be stacked, sorted, stapled, cut, bound, or inserted into an envelope by machinery operable to perform these functions. These instructions are hereinafter referred to as "post-print instructions."

Users of an ADF may desire to provide special post-print instructions for specific documents in print jobs. For example, billing statements for high-value customers may be inserted into decorative envelopes, while billing statements for regular customers may be inserted into plain envelopes. However, post-print instructions are tied to print jobs and not to specific documents within print jobs. Therefore, requesting that specific documents of a print job be treated differently during post-print handling remains a problem. Additionally, when a print job has already been received by the ADF it may be difficult to alter post-print instructions because the ADF may already be processing the documents for printing. Thus, if a print job does not already have appropriate post-print instructions before it is sent to an ADF, its documents may be improperly treated during post-printing. This in turn may result in the printed documents being thrown away and re-printed after detection of the error, which wastes time and resources.

SUMMARY

Exemplary embodiments described herein provide for modification of post-print instructions in an ADF environment. An ADF system initiates processing of a first print job. The ADF system also receives input asking that a document within the first print job be treated differently than other documents of the first print job during post-print processing. The ADF system pulls the document from the first print job (already being processed within the ADF system), and generates a second print job that includes the pulled document. The second print job also includes instructions describing post-printing processing to be performed on the pulled document. Thus, even at a late-stage after a print job has been sent to an ADF system and processing has been initiated, documents may be extracted from the print job so that these documents may be treated differently during post-printing.

In one embodiment, an ADF system includes a data center and a post-printing system. The data center is operable to receive a first print job that includes a plurality of documents and a first post-print instruction defining how the documents are processed after printing. The data center is also operable to receive a request that one or more documents in the print job be processed according to a second post-print instruction, and to extract the document(s) from the print job to generate a second print job. The second print job includes the extracted document(s) and the second post-print instruction defining how the document(s) are processed after printing. The post-printing system is operable to process the remaining documents of the first print job according to the first post-print instruction, and to process the document(s) of the second print job according to the second post-print instruction.

In another embodiment, a method for assigning post-print instructions in an ADF system is provided. The method includes receiving a first print job that includes a plurality of documents and a first post-print instruction defining how the documents are processed after printing. The method also includes receiving a request that one or more document(s) in the first print job be processed according to a second post-print instruction. According to the method, the document(s) are extracted from the first print job to generate a second print job that includes the document(s) and the second post-print instruction defining how the document(s) are processed after printing. The method also includes processing the remaining documents of the first print job according to the first post-print instruction, and processing the documents of the second print job according to the second post-print instruction.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 3 illustrates a user interface for communicating with an ADF system in an exemplary embodiment.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
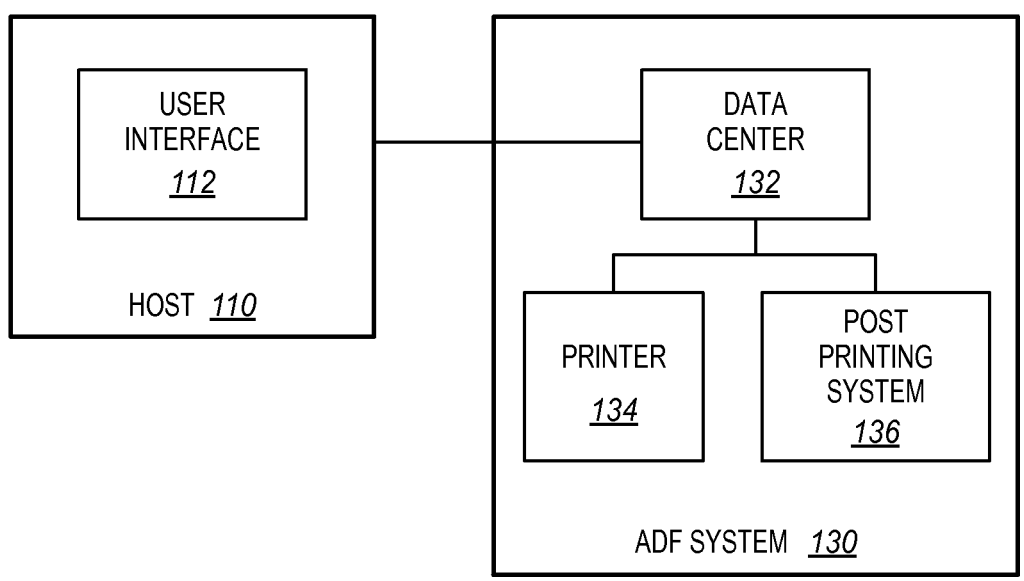
FIG. 1 is a block diagram of an ADF system in a print shop environment in an exemplary embodiment.

FIG. 1 is a block diagram of an ADF system 130 in a print shop environment in an exemplary embodiment. ADF system 130 comprises any system, component, or device operable to manage print jobs within a production printing environment. In this embodiment, ADF system 130 comprises data center 132, printer 134, and post-printing system 136. Data center 132 is operable to generate and alter print jobs already within ADF system 130. Each print job includes an instruction defining how its printed documents are processed by post-printing system 136. Data center 132 receives input from user interface 112 of host 110, and is operable to modify the post-print instructions for documents of print jobs based upon this input. Data center 132 directs printer 134 to print documents of print jobs and also directs post-printing system 136 to process the documents of each print job according to the instructions included with the print job.

Printer 134 comprises any system operable to receive a print job and print the logical pages of the print job to generate printed documents. Printer 134 may be operable to report feedback to data center 132 (e.g., number of pages printed in a print job, current printer settings, etc).

Post-printing system 136 comprises any system, components, or devices operable to process documents of a print job that have been printed according to their post-print instructions. Post-printing system 136 may include a stapler, cutter, binder, diverter, inserter, hole puncher, stacker, or other post-printing device. Post-printing system 136 is operable to receive instructions for a print job, and to identify the printed documents of the print job for processing. Post-printing system 136 may uniquely identify printed documents by correlating machine-readable markings on the documents with parameters included in the instructions sent by data center 132. Once a post-print instruction has been associated with a printed document, actual physical processing of the document may be achieved by any combination of post-printing devices. Further details of the operation of ADF system 130 will be discussed with regard to FIG. 2.

Figure 2:
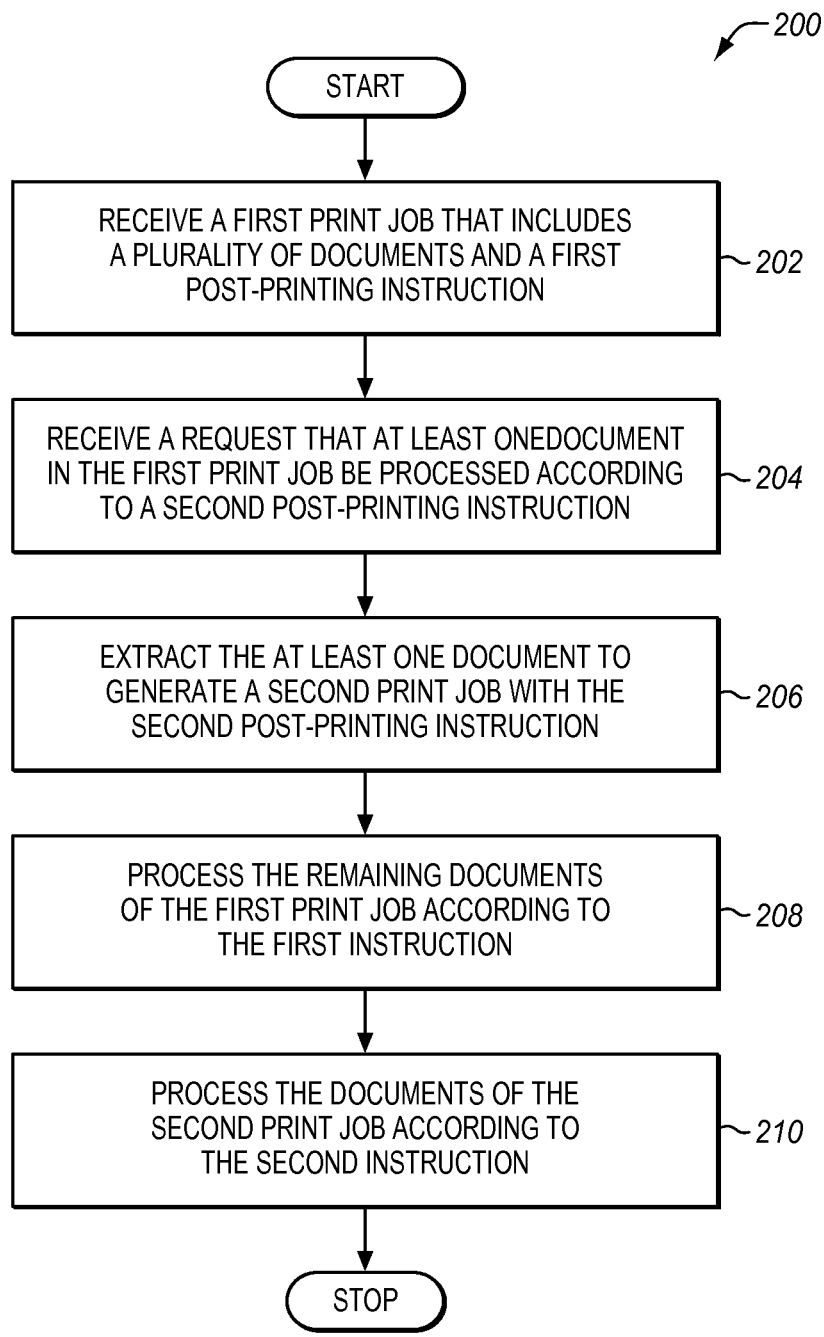
FIG. 2 is a flowchart illustrating a method for modification of post-print instructions in an exemplary embodiment.

FIG. 2 is a flowchart illustrating a method 200 for modification of post-print instructions in an exemplary embodiment. The steps of method 200 are described with reference to ADF system 130 of FIG. 1, but those skilled in the art will appreciate that method 200 may be performed in other systems. The steps of the flowcharts described herein are not all inclusive and may include other steps not shown. The steps described herein may also be performed in an alternative order.

At step 202, data center 132 receives a first print job that includes a plurality of logical documents and a first post-print instruction (hereinafter, "first instruction"). The first instruction defines how the documents are processed after they are printed. For example, the first instruction may indicate that the printed documents of the first print job should be inserted into an envelope for mailing. Data center 132 may initiate processing of the first print job by preparing it for printing. For example, data center 132 may rasterize, compress, transmit, convert, or queue the first print job. Data center 132 may also send the first print job to printer 134 so that printer 134 may initiate printing.

At some point after data center 132 has initiated processing of the first print job, data center 132 receives a request that one or more documents in the first print job be processed according to a second post-print instruction (see step 204). The request may be received, for example, via user interface 112 of host system 110. The second post-print instruction (hereinafter, "second instruction") is different than the first instruction for the first print job. For example, the first instruction may indicate that the printed documents of the first print job should be hole-punched, while the second instruction may indicate that selected documents should be stapled. The second instruction indicated by the request may include, for example, any combination of settings for cutting, stacking, sorting, coloring, stamping, hole-punching, diverting, or inserting the document(s) into an envelope. Settings may also include disposition information describing how and where the document(s) should be delivered.

The request received by data center 132 may also include rules and criteria for identifying document(s) to be processed according to the second instruction, or may explicitly indicate these document(s). For example, the request may comprise a list of documents, selection criteria (e.g., document metadata, an account number, keywords within the document, the intended recipient of a given document, etc.), or a document property (e.g., document size, author name, date the document was created, etc.). In one embodiment, the request indicates that data center 132 should automatically identify documents for removal so as to reduce the setup/processing time of post-printing system 136 (e.g., to speed up the overall processing time of print jobs through ADF system 130 by grouping documents with similar properties.)

At step 206, data center 132 extracts the document(s) from the first print job to generate a second print job having the second instruction. In one example, data center 132 extracts documents from the first print job by manipulating an internally stored memory that queues printing data for printer 134, and generates the second print job within the internal memory. Data center 132 may also be operable to interrupt processing of the first print job in order to extract the requested documents.

Documents for the first and the second print job are printed at the direction of data center 132. In one embodiment, documents of the first and second print jobs are both printed by printer 134. Data center 132 may be operable to transmit the first print job to printer 134 while the second print job is being generated so that printer 134 prints the first print job before it receives the second print job. In another embodiment, data center 132 prioritizes the second print job such that the second print job is printed before, after, or at the same time as the first print job.

At step 208, post-printing system 136 processes the printed documents of the first print job based upon the first instruction. This may include, for example, sorting, stacking, cutting, binding, or stapling the printed documents of the first print job. At step 210, post-printing system 136 processes the printed documents of the second print job based upon the second instruction.

The features described above advantageously allow users to alter the way that printed documents of a print job are treated during post-printing, regardless of whether the print job has already entered ADF system 130 for processing (e.g., as the print job is being rasterized, compressed, transmitted, etc.). Thus, users of ADF systems may alter the way that documents are treated after printing even at a late stage during the printing process.

FIG. 3 illustrates a user interface 112 for communicating with an ADF system in an exemplary embodiment. User interface 112 is generated by data center 132 and provides functional tools that allow communication with data center 132. In this embodiment, user interface 112 comprises review list 302, filter menu 304, summary display 306, and action menu 308. Review list 302 displays the documents of a given print job, along with a variety of document properties (dispatch type, review status, and document number). Utilizing review list 302, a user may select documents to be processed according to a new post-print instruction. The contents of review list 302 may be filtered via filter menu 304. For example, filter menu 304 may filter documents for display in review pane 302 based upon any number of criteria. Summary display 306 provides a user with information on changes that are pending for the print job displayed in review list 302. For example, summary display 306 may indicate the number of documents of the print job that have been selected for removal from the print job. Action menu 308 allows the user to perform actions upon the documents of the print job displayed in review list 302 from host system 101. Such actions may include "splitting" selected documents into a second print job, or canceling pending changes to the print job.

EXAMPLES

In this example, additional processes, systems, and methods are described in the context of an ADF system that prints and sorts bills for mass-mailing to customers. Here, ADF system 130 receives print jobs at data center 132 from host system 110. ADF system 130 processes these print jobs by rasterizing them so that they are readable by printer 134, and instructs printer 134 to print the documents of the jobs. After printer 134 prints the documents, post-printing system 136 processes the documents based upon the post-print instructions for each print job. In this example, the instructions indicate the type of envelope that the documents of the print job should be inserted into before they are mailed.

In the above example, a user may realize that there is a problem within a first print job that has already been sent to ADF system 130 for processing. For example, the post-print instruction for the first print job may indicate that its documents should be inserted into a plain envelope. However, the first print job may inadvertently include a number of documents relating to high-value customers. For high value customers, gold envelopes are used instead of plain ones. In this example, the user sends ADF system 130 a request that identifies the documents relating to high value customers. The request also includes a second instruction indicating that these high value customer bills should be inserted into gold envelopes. Data center 132 stops rasterizing documents of the first print job, and cancels printing of rasterized documents that have been sent to printer 134. Data center 132 identifies the documents requested by the user, and extracts these documents from the first print job. A second print job is generated and populated with the extracted documents. The second instruction is then associated with the second print job to indicate that these documents should be inserted into gold envelopes. Next, data center 132 directs post-printing system 136 to discard documents from the first print job that were printed before the request was received, rasterizes and transmits the remaining documents of the first print job to printer 134, and rasterizes and transmits the documents of the second print job to printer 134. After the first and the second print job are printed at printer 134, post-printing system 136 treats the documents of each of the print jobs according to their associated instructions.

In another example, data center 132 decides to identify documents from a first print job that meet the terms of a Service Level Agreement (SLA) between a bank and its customers defining a set of document delivery requirements. An SLA may, for example, dictate the required date of delivery for bank customers' account statements. If an SLA requires that one document be sent out early among a print job of hundreds of thousands, it may be beneficial to remove the single document from the print job and print the single document separately in a second print job. Otherwise, printer 134 may take too long to print the single document, causing the document to be late and resulting in economic penalties under the SLA. Data center 132 checks an internal variable and determines that a user wishes for documents meeting the requirements of an SLA to be identified. Data center 132 then analyzes the document properties of each document within the print job. If a document property indicates that the document is associated with the SLA, data center 132 proceeds to extract the document from the print job and add it to a second print job that has been generated. After each document in the print job has been analyzed, data center 132 associates the second print job with a second post-print instruction desired by the user, and prioritizes the second print job so that it will be printed before the first print job. Finally, data center 132 and transmits the second print job to printer 134.

Figure 4:
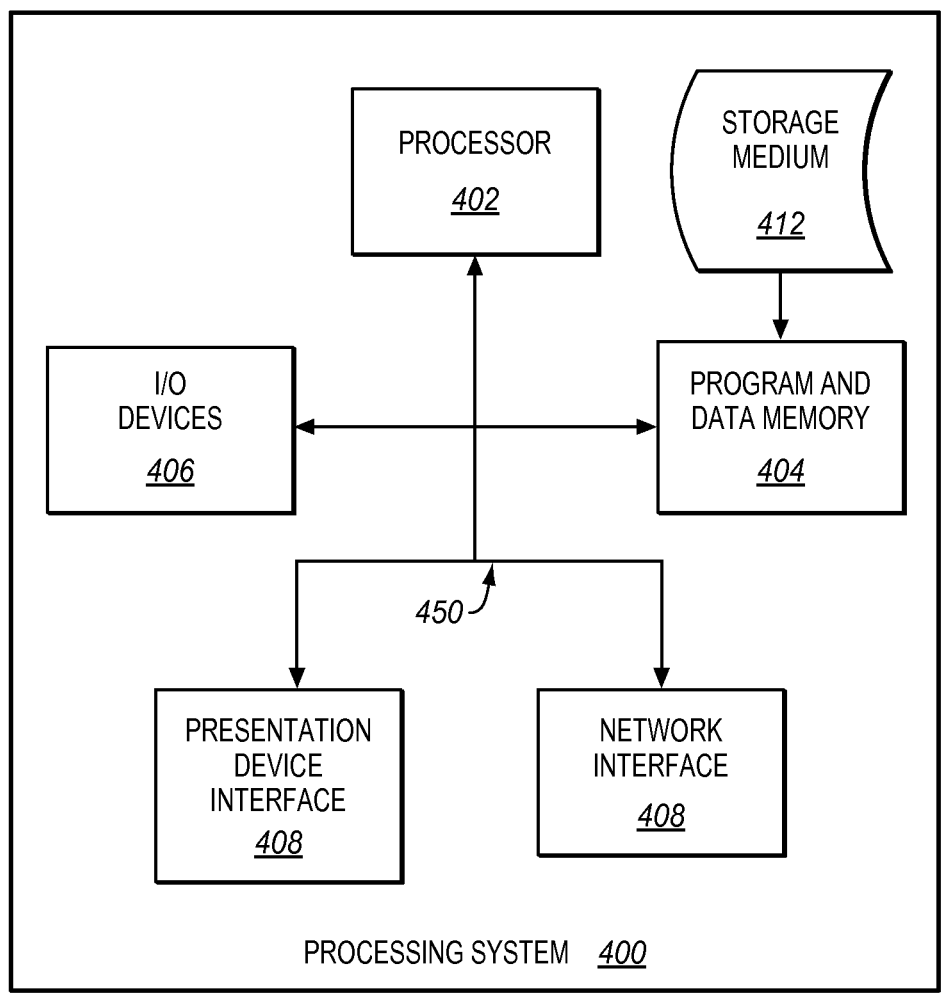
FIG. 4 illustrates a processing system operable to execute a computer readable medium embodying programmed instructions to perform desired functions in an exemplary embodiment.

As mentioned, embodiments disclosed herein can take the form of software, hardware, firmware, or various combinations thereof. In one particular embodiment, software is used to direct a processing system of ADF system 130 to perform the various operations disclosed herein. FIG. 4 illustrates a processing system 400 operable to execute a computer readable medium embodying programmed instructions to perform desired functions in an exemplary embodiment. Processing system 400 is operable to provide the above features by executing programmed instructions and accessing data stored on a computer readable storage medium 412. In this regard, embodiments of the invention can take the form of a computer program accessible via the computer-readable medium 412 providing program code for use by a computer or any other instruction execution system. For the purposes of this description, a computer readable storage medium 412 can be anything that can contain or store the program for use by the computer.

The computer readable storage medium 412 can be an electronic, magnetic, optical, electromagnetic, infrared, or semiconductor device. Examples of the computer readable storage medium 412 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 400, being suitable for storing and/or executing the program code, includes at least one processor 402 coupled to memory elements 404 through a system bus 450. The memory elements 404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 406 (including but not limited to keyboards, displays, pointing devices, etc) can be coupled to the system either directly or through intervening I/O controllers. Network adapter interfaces 408 may also be coupled to the system to enable the computer system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 410 may be coupled to the system to interface to one or more presentation devices, such as printing systems and displays for presentation of presentation data generated by processor 402.

Although specific embodiments were described herein, the scope of the invention is not limited to those specific embodiments. The scope of the invention is defined by the following claims and any equivalents thereof.

We claim:

1. An Automated Document Factory (ADF) system comprising:
 a data center operable to receive a first print job that includes a plurality of documents and a first post-print instruction defining how the documents are processed after printing, to receive a request, while the first print job is being rasterized, that at least one document in the first print job be processed according to a second post-print instruction, to cancel printing of the at least one document, to extract the at least one document from the first print job, to generate a second print job, to populate the second print job with the at least one document extracted from the first print job, to include the second post-print instruction with the second print job to define how documents of the second print job are processed after printing, to rasterize and transmit remaining documents of the first print job for printing, and to rasterize and transmit the documents of the second print job for printing; and
 a post-printing system operable to process remaining documents of the first print job according to the first post-print instruction, and to process the documents of the second print job according to the second post-print instruction.

2. The system of claim 1, wherein the data center is further operable to initiate pre-printing processing of the first print job, and to interrupt pre-printing processing of the first print job responsive to receiving the request.

3. The system of claim 1, wherein the second post-print instruction is different than the first post-print instruction.

4. The system of claim 1, wherein the data center is further operable to identify the at least one document from the first print job by determining that the at least one document meets the terms of a service level agreement (SLA) defining a set of document delivery requirements.

5. The system of claim 1, wherein the data center is further operable to identify the at least one document from the first print job to reduce a processing time of the post-printing system.

6. The system of claim 1, wherein the first and the second post-print instructions define how to sort the documents after printing.

7. A method for assigning post-printing instructions in an Automated Document Factory (ADF) system, the method comprising:
 receiving a first print job at the ADF that includes a plurality of documents and a first post-print instruction defining how the documents are processed after printing;
 receiving a request at the ADF, while the first print job is being rasterized, that at least one document in the first print job be processed according to a second post-print instruction;
 canceling printing of the at least one document;
 extracting the at least one document from the first print job at the ADF;
 generating a second print job;
 populating the second print job with the at least one document extracted from the first print job;
 including the second post-print instruction with the second print job to define how documents of the second print job are processed after printing;
 rasterizing and transmitting remaining documents of the first print job for printing;
 rasterizing and transmitting documents of the second print job for printing;
 processing the remaining documents of the first print job according to the first post-print instruction; and
 processing the documents of the second print job according to the second post-print instruction.

8. The method of claim 7, further comprising:
 initiating pre-printing processing of the first print job; and
 interrupting pre-printing processing of the first print job, responsive to receiving the request.

9. The method of claim 7, wherein the first post-print instruction is different than the second post-print instruction.

10. The method of claim 7, wherein:
 the request is for documents from the first print job that meet the terms of a service level agreement (SLA) defining a set of document delivery requirements, and
 the method further comprises identifying the at least one document from the first print job based on the request.

11. The method of claim 7, wherein:
 the request is that documents be removed from the first print job according to a function of post-printing processing time of the first print job, and
 the method further comprises identifying documents from the first print job according to the function of post-printing processing time of the first print job.

12. The method of claim 7, wherein the first and the second post-print instructions define how to sort the documents after printing.

13. A non-transitory computer readable medium embodying programmed instructions which, when executed by a processor, are operable for performing a method comprising:
 receiving a first print job at the ADF that includes a plurality of documents and a first post-print instruction defining how the documents are processed after printing;
 receiving a request at the ADF, while the first print job is being rasterized, that at least one document in the first print job be processed according to a second post-print instruction;
 canceling printing of the at least one document;
 extracting the at least one document from the first print job at the ADF;
 generating a second print job;
 populating the second print job with the at least one document extracted from the first print job;
 including the second post-print instruction with the second print job to define how documents of the second print job are processed after printing;
 rasterizing and transmitting remaining documents of the first print job for printing;
 rasterizing and transmitting documents of the second print job for printing;
 processing the remaining documents of the first print job according to the first post-print instruction; and
 processing the documents of the second print job according to the second post-print instruction.

14. The medium of claim 13, wherein the method further comprises:
 initiating pre-printing processing of the first print job; and
 interrupting pre-printing processing of the first print job, responsive to receiving the request.

15. The medium of claim 13, wherein the first post-print instruction is different than the second post-print instruction.

16. The medium of claim 13, wherein:
- the request is for documents from the first print job that meet the terms of a service level agreement (SLA) defining a set of document delivery requirements, and
- the method further comprises identifying the at least one document from the first print job based on the request.

17. The medium of claim 13, wherein:
- the request is that documents be removed from the first print job according to a function of post-printing processing time of the first print job, and
- the method further comprises identifying documents from the first print job according to the function of post-printing processing time of the first print job.

18. The medium of claim 13, wherein the first and the second post-print instructions define how to sort the documents after printing.

* * * * *